(No Model.)  2 Sheets—Sheet 1.
F. E. KOHLER.
HAY TEDDER.
No. 318,376. Patented May 19, 1885.
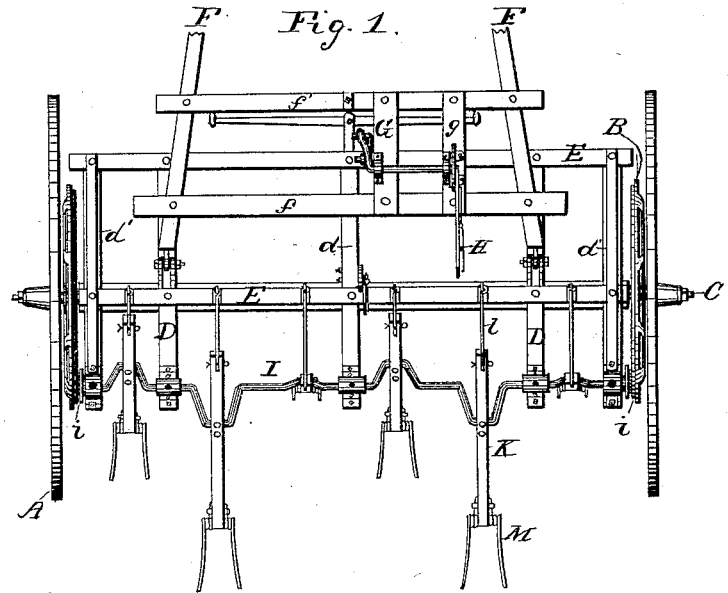
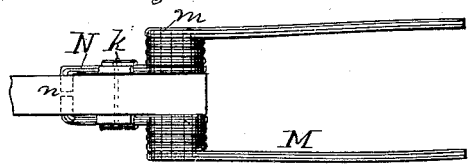
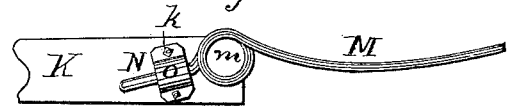
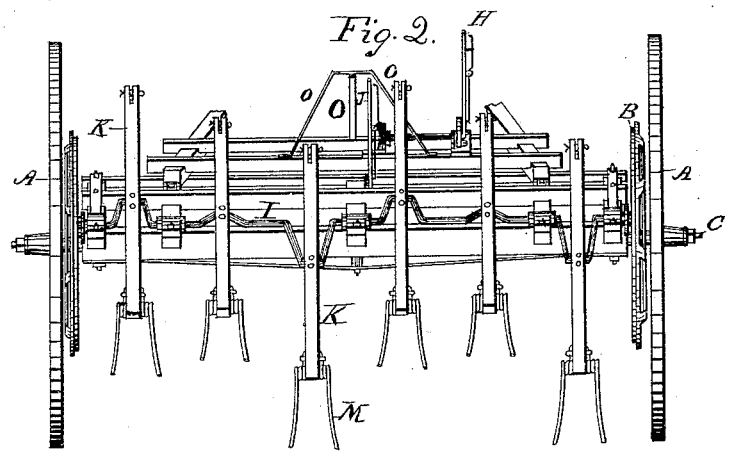
Witnesses
J. S. Barker
L. H. Marshall
Inventor
Frederick E. Kohler
by Doubleday & Bliss
attys (No Model.) 2 Sheets—Sheet 2.
F. E. KOHLER.
HAY TEDDER.
No. 318,376. Patented May 19, 1885.
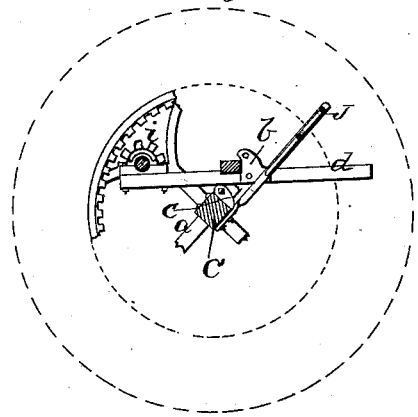
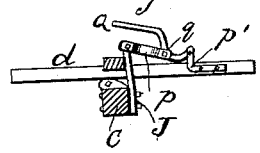
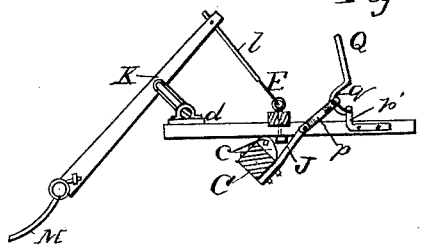
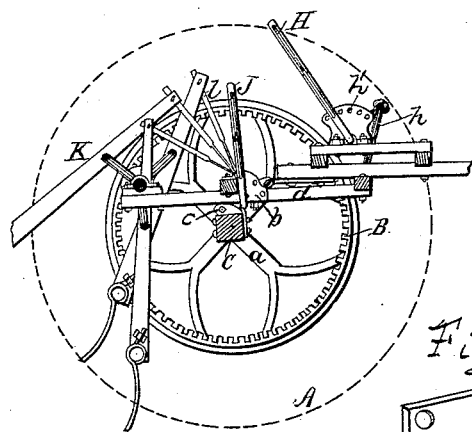
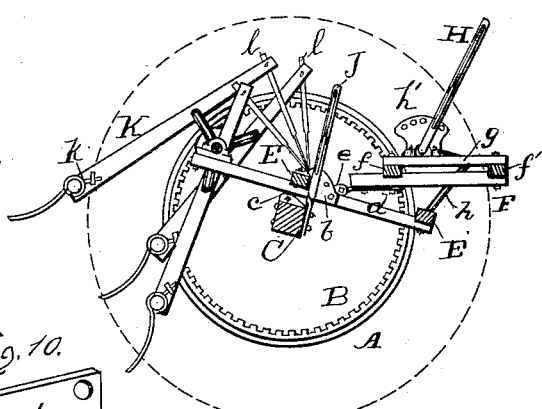
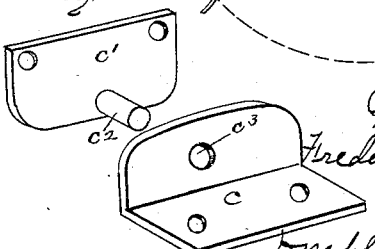

UNITED STATES PATENT OFFICE.

FREDERICK E. KOHLER, OF CANTON, OHIO.

HAY-TEDDER.

SPECIFICATION forming part of Letters Patent No. 318,376, dated May 19, 1885.

Application filed June 26, 1884. (No model.)

*To all whom it may concern:*

Be it known that I, FREDERICK E. KOHLER, a citizen of the United States, residing at Canton, in the county of Stark and State of Ohio, have invented certain new and useful Improvements in Hay-Tedders, of which the following is a specification, reference being had therein to the accompanying drawings.

Figure 1 is a top or plan view of a tedder containing my invention. Fig. 2 is a rear elevation. Fig. 3 is a cross-section with the parts in working position. Fig. 4 is a similar view with the main frame tilted to lift the tedder-teeth from the ground. Fig. 5 is a detached view showing the gears out of mesh. Fig. 6 is a detached view, enlarged, of the tedder-teeth, taken from the rear. Fig. 7 is a similar view of a tedder-tooth taken at right angles to Fig. 6. Figs. 8 and 9 are detached views showing an adaptation of the mechanism for throwing the gears carried by the crank-shaft into and out of mesh, which may be worked by the foot of the operator. Fig. 10 is a detached view of the devices by which the main frame is pivoted to the axle.

Like letters indicate like parts in all the figures.

A A are the main supporting and driving wheels. Each of these wheels has upon its inner face a concentric cogged rim, B, which may either have independent spokes $a\,a$ of its own projecting from the hub of the supporting-wheel, or it may be bolted or otherwise secured to the spokes of the main wheel in any usual or approved manner.

C is the through-axle, preferably of wood, and square in cross-section.

D D $d\,d'$ are bars arranged transversely on the axle.

E E' are bars or girts parallel to the axle, which, with the bars D $d\,d'$, constitute the main frame. The main frame is pivoted to the axle eccentrically—that is, on a line other than the center of the axle which forms the axis of the cogged rims—by means of ears or lugs $c\,c$, bolted to the upper surface of the axle, which, by preference, is flat, but may be of other shape, with a corresponding change in the under surface of the lugs.

Referring to Fig. 10, $c^2$ is a pin or pivot carried by a plate, $c'$, adapted to be attached to one of the longitudinal bars of the main frame. This pin $c^2$ is adapted to enter the aperture $c^3$ formed in the lug or ear $c$, and thus form a pivotal connection between the main frame and the axle.

F F are the thills, hinged at their rear ends to the transverse bars or rails D D, and connected by means of bars $f\,f'$, substantially as is customary in this class of tedders.

G $g$ are bars at right angles to bars $f\,f'$, and H is a bent lever journaled upon bars G $g$ and connected by a link, $h$, with the longitudinal bar E'.

$h'$ is a sector-plate mounted upon the bar $g$, and provided with a series of holes, into which a locking-latch or a projecting spur of lever H takes, by means of which devices the main frame can be tilted about the axle C.

I is the crank-shaft, having a series of cranks in different relative positions. This crank-shaft is mounted upon the rearwardly-projecting ends of the transverse bars D $d\,d'$, and carries at each end a pinion, $i$, (see Figs. 1 and 5,) which engage with the cogged rims B.

J is a shipping-lever bolted rigidly to the front face of the main axle C, and $b$ is a sector-plate bolted to the side of the longitudinal beam $d$, and provided with holes to receive a locking-spur or latch-bolt carried by the lever J.

K K are the arms, each mounted about midway between its ends upon the crank-shaft and connected at its upper end to the bar E by means of a link, $l$, substantially as is customary in this class of tedders.

M are the tedder-teeth, each formed of a single piece of wire having three, four, or more convolutions at $m$, and an inwardly-turned spur or locking-arm, $n$, at its upper end. This spur $n$ is seated in a socket formed for its reception in the tooth-arm K, the tooth being further secured to the arm by means of a clip, $k$, which is bolted to the arm, as shown in Figs. 6 and 7.

O $o$, Fig. 2, represent the seat-support, which in this instance consists of a tripod, the two rear legs of which are bolted to the bar $f$, the front leg, O, being bolted to the bar $f'$, about midway between the ends of these bars, thus bringing the seat within convenient reach of the levers.

My improved tedder may be operated as follows: When the parts are in the position shown in Figs. 1, 2, and 3, the rotation of the main driving-wheels actuate the tedder-teeth in substantially the manner which is common in this class of machines. The driver can, by thrusting the upper end of the lever H forward, tilt the main frame into the position shown in Fig. 4, or into any position intermediate between that position and the one shown in Fig. 3, and thus regulate the points to which the teeth shall descend in their downward and rearward strokes or movements without disengaging the gearing; and in case he wishes to withdraw the pinions i i from mesh with the cogged rims B, and thus stop the rotation of the crank-shaft, he can move the upper end of the lever J forward, and thus rock the main axle in the hubs of the supporting-wheels, and move the main frame forward relatively to its supporting-wheels, as indicated in Fig. 5.

In Figs. 8 and 9 I have shown an adaptation of the devices for withdrawing the pinions carried by the crank-shaft from mesh with the cogged rims, which may be operated by the foot, it differing from the construction shown in the other figure in having the lever J, which is rigidly attached to the axle, shorter than when it is to be used as a hand-lever, and in combining therewith other operating devices, which particularly adapt it for use as a foot-lever. In these figures the lever J, attached to the front face of the axle, is short, and is connected by means of a link, p, with the bow portion q of a bent lever, Q q, which is pivoted at its lower end to either the bar d or to an ear, lug, or bracket, p', attached to the bar, thus forming a sort of toggle-lever device, by means of which the spur-pinions will be locked in mesh, as shown in Fig. 8, and will be held out of mesh by the weight of the main frame, the rear end of the shafts, and the driver when the parts are in the position shown in Fig. 9.

In both constructions, as will be seen from an examination of the drawings, the weight of the driver is so applied as to assist in holding the gears in mesh, since the main frame is pivoted to the main axle in rear of the center of said axle, as shown in Figs. 3, 5, and 8, and when the pinions have been withdrawn from the cogged rim the weight of the driver may also be utilized to hold them out of mesh, as is indicated in Figs. 5 and 9, these results being made possible by pivoting the main frame to the axle above the centers of rotation of the supporting and driving wheels A A.

This construction of parts also enables me to reduce the cost of the machine by using a straight axle with simply lugs mounted upon its upper surface to receive the pivots of the main frame, which pivots I prefer to cast upon the inner faces of plates or downwardly-projecting ears adapted to be bolted to the vertical faces of the bars D d d' or a part of them.

I am aware that it is old in a hay-tedder to disengage the pinions which operate the crank-shafts from the cogged rims carried by the supporting-wheels by means of a bell-crank lever pivoted to the frame of the tedder, the said lever being connected by a link with other levers, which in turn move vertical sliding bars, in the upper ends of which are mounted the outer ends of the fork-operating crank-shafts, the pinions upon the outer ends of such shafts being thrown into or out of mesh as the bell-crank lever is moved in one direction or the other, and I do not claim such a combination of devices; but my arrangement differs materially from such a construction in that I effect the separation of the pinions and cogged rims by rocking or turning the frame and axle relatively to each other upon a pivotal connection, which is eccentrically arranged relative to the axis of the cogged rims, which, rocking or turning, separates the meshing gears as the axle is turned in one direction and brings them together as it is turned in the opposite direction.

What I claim is—

1. In a hay-tedder, the combination, with the supporting-wheels, the axle, and the cogged rims concentric with the axle, of the main frame eccentrically pivoted to the axle, the crank-shaft, pinions carried by the crank-shaft adapted to mesh with the cogged rims, and a lever attached to the axle and adapted to rock the axle in its pivotal connection with the main frame to withdraw the pinions from mesh with the cogged rims, substantially as set forth.

2. In a hay-tedder, the combination, with the supporting-wheels and the axle C, of the cogged rims, the main frame pivoted above the axle, the crank-shaft and its pinions, the thills hinged at their rear ends to the main frame, the lever mounted upon the thills for tilting the main frame, and the lever rigidly attached to the axle for withdrawing the pinions from mesh with the cogged rims, substantially as set forth.

3. In a hay-tedder, the combination, with the supporting-wheels, the axle, and the cogged rims, of the main frame, the crank-shaft, the pinions carried by the crank-shaft, the perforated lugs or ears c c, secured to the axle, the pivots carried by the main frame, which engage with said ears, and the lever attached to the axle, by which the axle is rocked upon said pivots to move the pinions into or out of mesh with the cogged rims, substantially as set forth.

4. In a hay-tedder, the combination, with the supporting-wheels, the axle, and the cogged rims, of the main frame eccentrically pivoted to the axle, the crank-shaft, the pinions carried by the crank-shaft, the lever J, attached to the axle, the bent lever Q q, and the link p, substantially as set forth.

In testimony whereof I affix my signature in presence of two witnesses.

FREDERICK E. KOHLER.

Witnesses:
C. F. PERKINS,
ANTHONY FAGER.